United States Patent [19]

Douthart et al.

[11] 4,443,749

[45] Apr. 17, 1984

[54] MULTIPLE SPEED SPLIT-PHASE INDUCTION MOTOR

[75] Inventors: Robert H. Douthart, Burlington, N.C.; Howard W. Smith, West Carrollton, Ohio

[73] Assignee: A. O. Smith Corporation, Milwaukee, Wis.

[21] Appl. No.: 433,214

[22] Filed: Oct. 7, 1982

[51] Int. Cl.³ .............................................. H02P 1/42
[52] U.S. Cl. .................................... 318/774; 318/786; 318/793
[58] Field of Search ............... 318/773, 774, 775, 786, 318/787, 790, 785, 793

[56] References Cited

U.S. PATENT DOCUMENTS

| | | | |
|---|---|---|---|
| 2,669,683 | 2/1954 | Burdett | 318/775 |
| 3,153,184 | 10/1964 | Stout | 318/774 |
| 4,314,987 | 7/1982 | Fisher | 318/774 |

*Primary Examiner*—David Smith, Jr.
*Attorney, Agent, or Firm*—Andrus, Sceales, Starke & Sawall

[57] ABSTRACT

An AC split-phase induction motor has a two-pole run winding, a four-pole run winding and a separate start or phase winding. The two-pole winding is connected directly to a corresponding first power terminal. The second run winding is connected to a second power terminal by a solid state gated run switch having a turn-on gate. The start winding is connected in circuit in series with a solid state gated start switch connected to the first power terminal and having a gate connected to a second power terminal. A centrifugal switch connects the first and second power terminals. The gate of the run switch is connected to the start winding circuit and includes connecting Diac and resistance elements to actuate the run switch only in response to a power connection to the second power terminal and the opening of the centrifugal switch. In operation, the motor always starts with the two-pole run winding and the start winding in the circuit. At switching speed, the start switch disconnects the start winding. Depending upon the power terminal connection, the motor continues to run with power supplied to the two-pole run winding or actuates the solid state gated run switch of the four-pole winding to operate as a four-pole motor.

6 Claims, 2 Drawing Figures

MULTIPLE SPEED SPLIT-PHASE INDUCTION MOTOR

BACKGROUND OF THE INVENTION

The present invention relates to a multiple speed split-phase induction motor and particularly to an induction motor having first and second run winding means and a starting winding means which is disconnected as the motor reaches or approaches operating speed.

A.C. induction motors are widely used in industrial, institutional and domestic applications. Single speed induction motors are constructed with a run winding connected in parallel with a starting winding. The starting winding may be connected with a phase shift capacitor or other impedance or may be specially wound to increase the starting torque of the motor. A centrifugal switch unit or an electromagnetic switch unit is generally connected in circuit with the start winding to disconnect the start winding at a selected speed, after which the motor operates with only the run winding connected. Although centrifugal and mechanical switches have been employed for many years, solid state switches devices have more recently been provided in place of the centrifugal switch. For example, General Electric application note 200.35, page 16, discloses an A.C. split-capacitor start motor in which a starting winding is connected in parallel with the running winding. The starting winding circuit includes a starting capacitor and a solid state switch shown as a "Triac". The solid state switch has a gate circuit coupled to the incoming power supply lines through a current transformer. The solid state switch is gated on only until the motor approaches running speed and then turns off to disconnect the start winding with the motor current at the normal operating level. The solid state switch replaces the conventional centrifugal switch or electromechanical relay. In either instance, the cut out switch is designed to open at a selected speed, thereby removing the starting winding and maintaining motor operation under efficient operating conditions with only the running winding connected to the power lines.

As more fully enclosed in the present inventor's co-pending application, entitled "Multiple Speed Induction Motor" filed on even date herewith, certain applications may demand different but constant speeds and a particularly simple but reliable winding and switch control for a dual winding and speed motor having a capacitor in series with the start winding is disclosed. The inventor's copending application discloses a unique combination of a first and second solid state switches controlling respectively, a first run winding and a start winding in combination with a mechanical or electromechanical type switch to control the selectively connecting of the start winding and one of the two run windings into circuit. Other multiple speed induction motors have been suggested in which the connection of a winding means, which is wound in different pole arrangements, is selectively connected in circuit by a selection switch and a centrifugal switch to permit operation of the motor at different speeds and with a single start winding unit, as more fully discussed in such application.

SUMMARY OF THE INVENTION

The present invention is particularly directed to an improved A.C. split-phase induction motor having separate run windings for each speed and a separate start winding, with the windings selectively connected to a plurality of power terminals which in turn are selectively connected to a single phase incoming power supply, and includes a speed responsive switch, a solid state start switch controlling the start winding and a second solid state switch controlling a switched speed winding. More particularly, a first non-switched run winding having a relatively low number of poles is connected directly to a corresponding run power terminal and to the second run power terminal in series with the speed responsive switch for connection to the incoming power supply lines, and is always connected during the starting of the motor as a main start-run winding. The start winding is connected to the same power terminals in series with a solid state gated start switch. A second switched run winding is selectively connected into the circuit and particularly operatively to its power terminal by a solid state gated run switch only in response to a power connection to such power terminal to effect the second operational or speed mode of the motor. The terminology "switched" and "non-switched" is used herein to differentiate between the two run windings based on the special gated switch which is present in the circuit of the one run winding to its power terminal. The gate of the solid state run switch is connected into a circuit of the start winding such that the solid state switch is actuated only in response to operation of the motor speed sensitive switch and the connection of power to the second power terminal.

Depending upon the incoming power connection, operation of the start switch changes the power connection to establish operation with power to the appropriate run winding and disconnection of the starting winding from the start circuit and from the power supply.

In operation, the motor starts in the same configuration with the non-switched run winding and start winding in circuit. At the selected speed, the start switch opens disconnecting the start winding. Depending upon the power terminal connection, the motor continues to run with power supplied to the non-switched run winding or to actuate the solid state run switch of the switched run winding to supply power to the switched run winding.

In a preferred embodiment, the start switch connects the start winding to power in parallel with the first run winding. A centrifugal or other speed responsive switch connects the first and second run power terminals. The gate of the start switch is connected to the second power terminal in series with a dropping resistor. The gate of the solid state run switch is connected to the connection of the gated side of the solid state start switch in series with voltage dropping diode means and a dropping resistance means. When power is supplied to the alternate or second power terminal, the motor again starts with the non-switched run winding and the start winding connected in circuit through the centrifugal switch. The gate of the solid state run switch for the switched run winding is held at a turn off potential by current flow through the start winding. The motor again starts with the first run winding in circuit and at the selected speed, the centrifugal switch opens and removes power from the starting circuit and simultaneously from the non-switched run winding. The full voltage now is applied through the start winding, dropping diode means and resistor to the gate of the solid state run switch which conducts to energize the second run winding. The motor thereby continues to operate in the alternate mode.

The present invention thus provides a split-phase induction motor having a simple reliable means using readily available solid state switches and speed responsive switches for connecting a start winding to one run winding for starting and then selectively connecting one of two run windings into circuit for creating a multiple speed motor.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a schematic illustration of a multiple speed motor including a two-pole run winding and a four-pole run winding and connected for a two-pole run mode of motor operation; and FIG. 2 is a view corresponding to FIG. 1 showing the alternate circuit connection for a four-pole run mode of motor operation.

DESCRIPTION OF THE ILLUSTRATED EMBODIMENT

Figure 1:
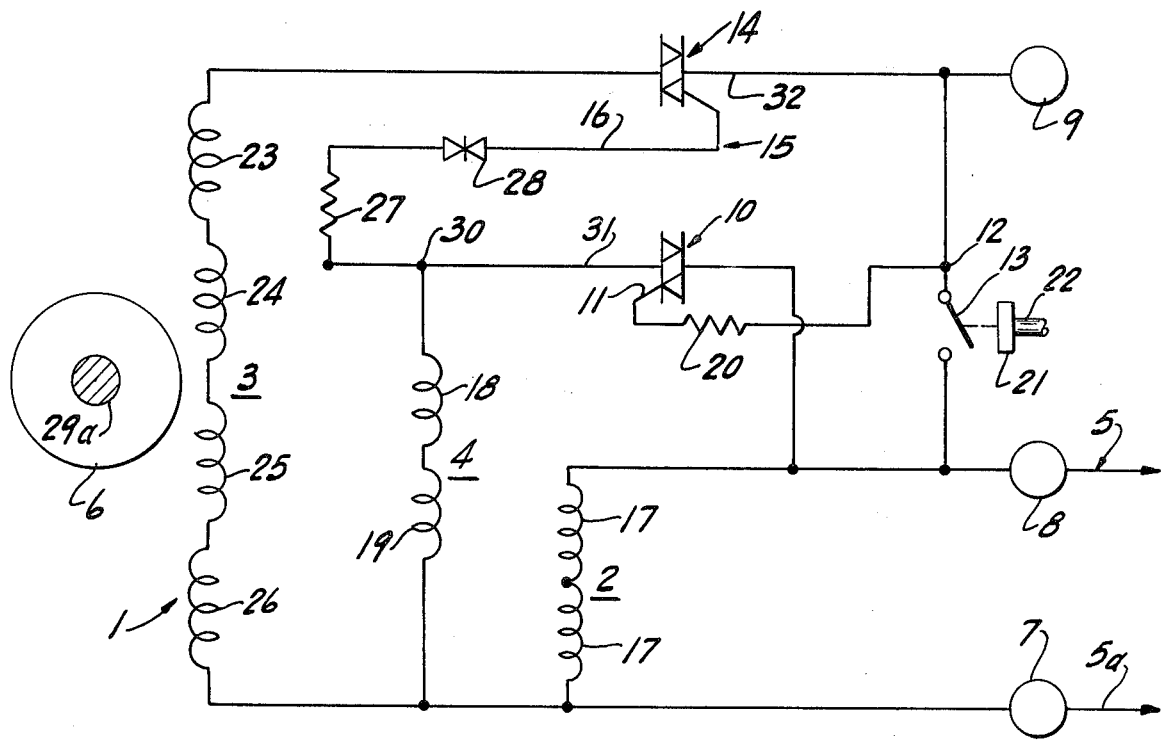

Referring to the drawings and particularly to FIG. 1, a multiple speed A.C. split-phase induction motor is schematically illustrated. The A.C. induction motor shown is a single phase motor adapted to operate as a two-pole or four-pole motor and thus at two selected speeds. Any other suitable combinations of operating poles may be used by appropriate winding construction. In the illustrated embodiment, the motor stator 1 includes a two-pole run winding 2 and a four-pole run winding 3 which are connected in a motor circuit with a start winding 4. A set of single phase power supply lines 5 and 5a is selectively connected to supply power to the windings 2-4. A rotor 6 is coupled to the stator 1 and operates to produce a motor output based upon the energization of windings 2-4. The windings 2-4 are connected to power lines 5-5a by separate terminals or power connection means including a common power terminal 7, a two-pole run power terminal 8 and a four-pole run power terminal 9. In FIG. 1, power supply terminal 7 is connected as the common supply to line 5a for all three windings 2-4 inclusive. The two-pole power terminal 8 and the four-pole power terminal 9 are selectively connected to the power line 5 as shown respectively in FIGS. 1 and 2 for operating of the motor as a two-pole motor or a four-pole motor. Thus, only one of the power terminals 8 and 9 is connected to the supply power line 5, depending upon the desired motor operating mode. Although shown as a direct connection, suitable switching means can of course be provided for connection of the incoming power lines to the motor terminals.

In both circuit connections, power is also supplied to the start winding 4 which is connected in circuit to both terminals 8 and 9. The circuit for the start winding 4 includes a solid state gated switch 10 which is schematically shown as a well known thyristor sold under the trademark "Triac" by General Electric Company. The switch 10 has a gate 11 connected to power terminals 8 and 9 for turning the switch on and thereby supplying power to the starting winding 4. The start winding circuit is connected to power terminal 7 and terminal 8.

In the illustrated embodiment of FIG. 1, a centrifugal switch 13 is shown interconnecting terminals 8 and 9, with the gate 11 of the start switch 10 connected to the common connection 12 to power terminal 9 and the switch 13.

The two-pole winding 2 is connected directly to its power terminal 8. The winding 2 is thus provided with power directly from terminal 8, or through centrifugal switch 13 from terminal 9.

The four-pole winding 3 is connected to the four-pole power terminal 9 in series with a solid state gated switch 14 having a gate 15 for turning the switch on. Gate 15 is connected in circuit through a connecting branch 16 which is connected to power through the gated side of the solid state start switch 10. The solid state switch 14 is normally open and holds the circuit de-energized or open. The switch 14 is turned on and four-pole run winding 3 powered, as described hereinafter, only when the power terminal 9 is connected to the power supply line 5, and then after operation of switch 13, which results in a supply of power to switch 14 for operation.

The initial connection of motor power always supplies power to the two-pole winding 2, and through the solid state start switch 10 to the start winding 4, such that the motor always starts as a two-pole wound motor. This starting power connection is maintained even when the power line 5 is connected to the four-pole input terminal 9 as a result of the connection of the centrifugal switch 13 directly between terminals 8 and 9.

With the line 5 connected to terminal 8, the motor starts as a two-pole motor. The power to the gate 15 of the four-pole run switch 14 is held below the turn-on level. When the centrifugal switch 13 opens, power is removed from the starting winding 4 and the motor continues to run in the two-pole motor mode.

When power line 5 is connected to terminal 9, as shown in FIG. 2, the motor again starts as a two-pole motor. Gate 15 is held below the turn-on potential and remains off. At the selected speed, the centrifugal switch 13 again opens, which removes power from the two-pole run winding 3 and the main power or current path of switch 10. Winding 2 and start winding 4 are thus disconnected. Power is now supplied to the gate 15 of switch 14 thru start winding 4, as more fully described hereinafter, a resistor 27 and a Diac 28, such that the bias signal applied to the firing level and switch 14 turns on and supplies power to the four-pole winding 3. The motor now runs as in the four-pole winding.

Figure 2:
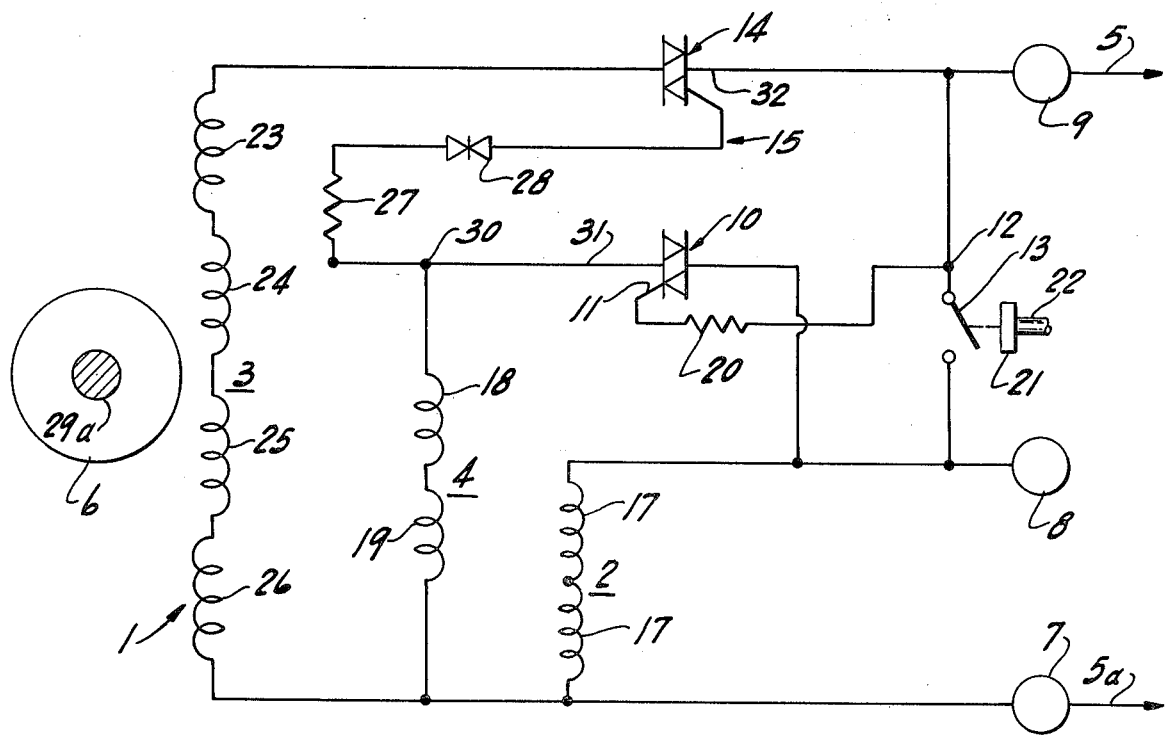

More particularly, the two-pole winding 2, as shown in FIGS. 1 and 2, includes a pair of series-connecting windings 17 connected directly between the power terminal 7 and the two-pole power terminal 8. The start winding 4 is a two-pole winding including windings 18 and 19 which are wound in the conventional manner and angularly offset with respect to the run windings 2 and 3. The start winding 4 is shown connected to common terminal 7. The opposite side of the start winding 4 is connected in series with the solid state switch 10 to the two-pole power terminal or connection 8.

The solid state switch 10 is shown as a known "Triac" with the main power terminals connected between the start winding 4 and the first or two-pole terminal. The input gate 11 is powered during each half cycle of the A.C. power supply. In the illustrated embodiment of the invention, the gate 11 is located to the winding side of the switch and is connected in series with voltage dropping resistor 20 to the common connection 12 of the switch 13 and the second or four-pole power terminal 9, and gate power is derived from the circuit of the two-pole power terminal 8 through switch 13 or from power terminal 9.

The centrifugal switch 13 is diagrammatically illustrated as a mechanically actuated switch unit which has been and is used in capacitor-start induction motors. A centrifugal operator 21 is coupled to the switch 13 and is mounted to the rotor shaft 22 as diagrammatically illustrated. The shaft 22 rotates at motor speed. At a selected speed, the centrifugal operator 21 moves to open the switch 13, thereby opening the power connection from the power terminal 8 to the node 12, and thereby operates to open the power supply connection from the power terminal 8 to the firing circuit branch of the start winding circuit. The switch 10 turns off and de-energizes the start winding 4.

The centrifugal switch 13 also controls the application of start power to windings 2 and 3 when power line 5 is connected to the four-pole terminal 9. The four-pole winding 3 includes four equicircumferentially windings 23, 24, 25 and 26. The several individual windings 23–26 are connected in series with each other and the solid state gated wwitch 14 between terrnials 7 and 9. Switch 14 is also shown as a "Triac" with its gate 15 connected in series with voltage dropping means including a gate bias resistor 27 and a voltage dropping diode unit 28 such as the well known Diac at a common node or connection 30 to the start switch 10 and to the start winding 4. The gate circuit path is completed through start winding 4 to terminal 7.

With switch 13 closed, the gate potential to gate 15 of switch 14 is thus determined by the voltage between power terminal 9 and power terminal 7. Thus start winding 4, Diac 28, resistor 27, gate 15 of switch 14 to main terminal of switch 14 to power terminal 9. The potential between power terminal 9 and node 30 is sufficient to turn on switch 14 when switch 10 is turned off.

As noted previously, the motor may be operated as either a two-pole run motor, as shown in FIG. 1, or alternately as a four-pole motor, as shown in FIG. 2.

Referring particularly to FIG. 1, in the two-pole mode, lines 5 and 5a are connected to the terminal 7 and 8. Current first flows through the direct connected two-pole winding 2. The current also flows through the switch 13, gate 11 and switch 10 to turn on the solid state start switch 10. Essentially instantaneously, current is supplied to both the run winding 2 and the start winding 4. The motor of course starts in accordance with well known theory of induction motors and accelerates. At a preselected speed, depending upon the setting and construction of the centrifugal operator 21, switch 13 opens. This, of course, removes power from the start winding node 12 and the gate 11 of switch 10, which turns off and removes power from the start winding circuit. The motor continues to run as a two-pole motor.

With the above two-pole power connection, power is impressed upon the four-pole gated switch 14 during starting. However, the gate current is insufficient to turn switch 14 on. Thus, the gate circuit connection impresses full applied potential through the gate 11 to the main terminal 31 of the switch 10 through the resistor 20, which is sufficient to turn-on switch 10 and cause the energization of start winding 4. At the same instant in time, the potential impressed across the gate circuit of switch 14 is approximately line voltage between dropping resistor 27, gate 15 and main terminal 32 of switch 14 to power terminal 9. The breakover voltage of the unit 28 is sufficient to decrease the potential between node 30 and power terminal 9 in conjunction with the resistance of resistor 20 limits the gate current to switch 14 and hold it in an off state until switch 10 is in conduction. When the switch 10 conducts, this applied voltage drops to approximately one volt, maintaining switch 14 off. When switch 13 opens, the applied power is removed, which prevents turn on of either switch 10 or 14 and the motor thus operates as a two-pole motor, as described above.

To establish a four-pole motor operational mode, the power lead 5 is disconnected from terminal 8 and connected to terminal 9 and common power line 5a is again connected to the common terminal 7, as shown in FIG. 2. In this connection, current initially flows from the four-pole terminal 9 directly to the node 12 and to the start winding circuit, which is of course initially off because of the open state of the solid state switch 10. Power is applied, however, through the closed centrifugal switch 13 to the power terminal of switch 10 and to the two-pole winding 2.

Main winding 2 is energized and switch 10 conducts and supplies current through the two-pole start winding 4 in the same manner as just described with respect to the two-pole mode of operations. This establishes a similar rotational acceleration of the motor rotor 6.

During this initial start period, power is supplied to the main terminal 32 of the four-pole switch 14 and also through the gate circuit of switch 10 to the gate circuit of switch 14, which remains open as discussed with respect to the two-pole circuit connection. Thus, switch 14 remains off because of the potential reduction of the diac and resistor 27 resulting in insufficient gate current to switch 14 with switch 10 off and only one volt when switch 10 turns on to establish the start and accelerate state of operation.

The motor thus accelerates as a two-pole motor. At a selected speed, the centrifugal switch 13 again opens. This now, however, removes power from the two-pole winding 2 and from the main terminal of switch 10. The winding 2 and 4 are therefore de-energized. Instantaneously, the impressed potential at the common gate circuit connection or node 30 increases from approximately one volt to the applied line potential between power terminals 7 and 9, as a result of the effective de-energization of winding 4. This full terminal potential is sufficient to cause switch 14 to turn on the gate circuit being from power terminal 7 through start winding 4, Diac 28, resistor 27, gate 15 of switch 14 to main terminal 32 of triac 14 to main terminal 9. The conduction of the switch 14 supplies power directly from the terminal 9 and supply line 5 to the series connected four-pole windings 23–26. The motor then operates in a four-pole operating mode.

The present invention with the two solid state switches and a suitable speed responsive switch provides a convenient and reliable multiple speed split phase induction motor using readily available, commercial components.

Various modes in carrying out the invention are contemplated as being within the scope of the following claims, particularly pointing out and distinctly claiming the subject matter which is regarded as the invention.

We claim:
1. A multiple speed split-phase induction motor comprising a first speed winding means, a second speed winding means, a start winding means, three power terminals including a first power terminal connected to the first speed winding and a second power terminal connected to the second speed winding and a common power terminal connected to said first and second speed windings and start winding means, a solid state gated start switch means connected in series with said start winding means, a solid state gated run switch means connected in series with said second speed winding means, a speed responsive switch means connecting the circuit of the start winding means to said first power terminal for de-energizing of said start winding means at a selected speed, and said solid state gated start switch means and said solid state gated run switch means each having an input gate and said input gates being connected in a control circuit to said second power terminal and said speed responsive switch means and including means to limit the firing of the solid state gated run switch means and conjointly operable to simultaneously energize said first speed winding and said start winding during an initial start period and responding to said de-energizing of said start winding to energize only one of said first speed winding and said second speed winding in accordance with the power connection to said first and second power terminals.

2. The motor of claim 1 wherein said speed responsive switch means connects said first and second power terminals to start the motor with said first speed winding and said start winding means energized with power connected to either said first power terminal or to said second power terminal, said gated start switch means being connected in series with said start winding means directly to said second power terminal to operate the motor with power applied to the first or second power terminal, said gated start switch means being responsive to operation of said start switch means to energize only said first speed winding with power applied to said first power terminal, said gated run switch means being connected in series with said second speed winding means directly to said second power terminal, the gate of said run switch means being connected to the output side of the start switch means, and said control circuit including a network having a separate impedance means in the gate of each of said switch means and voltage responsive means in the gate of said run switch means.

3. The multiple speed split-phase induction motor of claim 1 wherein said solid state gated start switch means and said solid state gated run switch means are each a thyristor operable to either polarity of an alternating current supply, and said speed responsive switch means is a centrifugally actuated switch.

4. The motor of claim 1 wherein said speed responsive switch means is a centrifugal switch connecting said first and second power terminals to start the motor with said first speed winding means and said start winding means energized with power connected to either said first power terminal or to said second power terminal, said gated start switch means being a thyristor connected in series with said start winding means directly to said second power terminal to operate the motor with power applied to the first or second power terminal, said start thyristor having a gate connected to said second power terminal in series with a dropping resistor, said gated start switch means being responsive to operation of said centrifugal switch to energize only said first speed winding with power applied to said first power terminal, said gated run switch means being a run thyristor connected in series with said second speed winding directly to said second power terminal, said run thyristor having a gate connected to the output side of the start thyristor and incuding a voltage responsive means to prevent turn-on of the run thyristor until the voltage on the control circuit rises above a selected voltage.

5. The motor of claim 4 wherein said voltage responsive means includes diode means.

6. A multiple speed split-phase induction motor comprising a first speed winding means having a first number of poles, a second speed winding means having a different number of poles than said first speed winding, a start winding means, three power terminals including a first power terminal connected to the first speed winding means and a second power terminal connected to the second speed winding means and a common power terminal connected to said first and second speed winding means and start winding means, a bidirectional start thyristor connected in series with said start winding means, a bidirectional run thyristor connected in series with said second speed winding means, a centrifugally operative switch connected to said first and second power terminal, said start thyristor connected to said first power terminal, said start thyristor having a gate and a resistor connecting said gate to said second power terminal, and said run thyristor having a gate, a second resistor, a voltage responsive diode means connected in series with said second resistor between said gate of said run thyristor and the connection between the start winding and the start thyristor and operable with said start thyristor and said centrifugal switch.

* * * * *

UNITED STATES PATENT AND TRADEMARK OFFICE
CERTIFICATE OF CORRECTION

PATENT NO. : 4,443,749
DATED : April 17, 1984
INVENTOR(S) : ROBERT H. DOUTHART ET AL It is certified that error appears in the above-identified patent and that said Letters Patent is hereby corrected as shown below:

Col. 5, line 24, Cancel "wwitch" and substitute therefor ---switch
Col. 7, line 38, Claim 2, After "winding" insert ---means---.

Signed and Sealed this

First Day of January 1985

[SEAL]

Attest:

Attesting Officer

GERALD J. MOSSINGHOFF

Commissioner of Patents and Trademarks